US008525077B2

(12) United States Patent
Peters et al.

(10) Patent No.: US 8,525,077 B2
(45) Date of Patent: Sep. 3, 2013

(54) TOUCH SCREEN WAVEFORM DESIGN APPARATUS FOR WELDERS

(75) Inventors: Steven R. Peters, Huntsburg, OH (US); Joseph Allen Daniel, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1931 days.

(21) Appl. No.: 11/382,310

(22) Filed: May 9, 2006

(65) Prior Publication Data

US 2007/0262065 A1   Nov. 15, 2007

(51) Int. Cl.
    *B23K 9/10* (2006.01)
(52) U.S. Cl.
    USPC .............. 219/130.5; 219/130.1; 219/130.01
(58) Field of Classification Search
    USPC .......................................... 219/130.5, 130.1
    See application file for complete search history.

(56) References Cited

U.S. PATENT DOCUMENTS

| | | | |
|---|---|---|---|
| 3,657,511 A | 4/1972 | Friedman et al. | |
| 4,972,064 A | 11/1990 | Stava | |
| 4,973,814 A | 11/1990 | Kojima et al. | |
| 5,059,765 A | 10/1991 | Laing | |
| 5,278,390 A | 1/1994 | Blankenship | |
| 5,349,157 A | 9/1994 | Blankenship | |
| 5,353,238 A | 10/1994 | Neef et al. | |
| 5,571,431 A | 11/1996 | Lantieri et al. | |
| 5,837,968 A | 11/1998 | Rohrberg et al. | |
| 6,002,104 A | 12/1999 | Hsu | |
| 6,111,216 A | 8/2000 | Stava | |
| 6,207,929 B1 | 3/2001 | Stava et al. | |
| 6,291,798 B1 | 9/2001 | Stava | |
| 6,486,439 B1 | 11/2002 | Spear et al. | |
| 6,515,251 B1* | 2/2003 | Wind | 219/86.1 |
| 6,624,388 B1 | 9/2003 | Blankenship | |
| 6,700,097 B1 | 3/2004 | Hsu et al. | |
| 6,717,108 B2 | 4/2004 | Hsu | |
| 6,734,394 B2 | 5/2004 | Hsu | |
| 6,924,459 B2 | 8/2005 | Spear et al. | |
| 7,064,290 B2* | 6/2006 | Blankenship et al. | 219/130.51 |
| 2005/0051524 A1 | 3/2005 | Blankenship et al. | |
| 2007/0050311 A1* | 3/2007 | Mohr et al. | 705/400 |

OTHER PUBLICATIONS

Power Wave 455M & Power Wave 455M/STT, The Lincoln Electric Company, pp. 1-8.
Wave Designer, Software for Waveform Control Technology, The Lincoln Electric Company, pp. 1-4.
International Search Report, PCT/US07/63665, Lincoln Global, Inc., Mar. 14, 2008.
International Preliminary report, Nov. 20, 2008.

* cited by examiner

*Primary Examiner* — Henry Yuen
*Assistant Examiner* — Ayub Maye
(74) *Attorney, Agent, or Firm* — Shannon V. McCue; Hahn Loeser & Parks LLP

(57) ABSTRACT

Welding systems and programming tools are described, in which a touch screen-based welding system configuration tool is provided having a touch screen display for designing welding power source waveforms or for configuring a system sequence controller, where the touch screen may be integrated into a welding system component. The touch screen displays information related to a switching type welding power source and/or a welding system sequence controller, as well as one or more touch activation indicia to allow a user to numerically or graphically configure the power source or the sequence controller by touching the touch activation indicia.

21 Claims, 9 Drawing Sheets

TOUCH SCREEN WAVEFORM DESIGN APPARATUS FOR WELDERS

FIELD OF THE INVENTION

The present invention relates to the art of electric arc welding with a welder having a switching type power source and more particularly to touch screen based configuration tools for designing waveforms for a switching type welder power source.

INCORPORATION BY REFERENCE

The following United States patents are hereby incorporated by reference as background information: Blankenship U.S. Pat. No. 5,278,390; Hsu U.S. Pat. No. 6,002,104; Spear U.S. Pat. No. 6,486,439; Spear U.S. Pat. No. 6,624,388; Hsu U.S. Pat. No. 6,700,097; Hsu U.S. Pat. No. 6,717,108; and Hsu U.S. Pat. No. 6,734,394.

BACKGROUND OF THE INVENTION

Programmable switching type welding power sources have been developed for providing controllable electrical voltage and/or current waveforms to a welding process, an example of which is presented in Blankenship U.S. Pat. No. 5,278,390 incorporated by reference herein. The power source of this Blankenship patent and other welding power sources sold by The Lincoln Electric Company of Cleveland, Ohio provide precise waveform control by which a welding signal waveform can be tailored or customized for the exact conditions of a given welding application. This waveform control technology has been a major advancement of the welding arts generally, enabling optimization of welding processes. In order to implement and control advanced welding processes, substantial knowledge and experience may be needed to select a suitable welding waveform having several control parameters to produce an optimum welding process, and power source control apparatus has been developed for use with electric arc welders that have real time current/voltage waveforms developed by welding engineers to optimize the welding process performed in the field.

As shown in Blankenship U.S. Pat. No. 5,278,390, a microprocessor based controller is used, by which an operator can select from a number of predefined welding waveforms by merely using one of several overlays. By using a known template for the controller, an operator selects a welding waveform having the desired control parameters especially developed by a skilled welding engineer for a selected weld process. This successful controller had a certain amount of adjustability in the field; however, such on-site adjustments were limited. Mass production use of arc welders has created a demand for the ability to conveniently adjust certain control parameters of the welding waveform in the field, especially when the welding process conditions are different than what is used in designing standard waveforms shipped with the welders (such as cable length, shielding gas and welding wire). Thus, there was a need for a controller to be used with switching type welding power sources, where the controller can process a desired waveform that is adjusted interactively at the manufacturing site so the waveform is optimized for welding conditions and welding requirements for the job.

To fill this need, an electric arc welder was developed with a microprocessor based controller for the specific arc welder, as generally shown in Hsu U.S. Pat. No. 6,002,104 incorporated by reference herein. This Hsu welder has a switching type power supply for creating a welding cycle, with a real time current waveform constituting several control parameters by rapidly switching a D.C. current in a controlled fashion by a pulse width modulator. This patented controller has been used with various switching type power supplies, wherein Hsu U.S. Pat. No. 6,002,104 illustrates a down chopper power supply for simplicity. In practice, any type of switching power source, such as a pulse width modulated inverter type power supply along or in combination with other power conversion stages, can be controlled according to the principles set forth in Blankenship and Hsu.

FIG. 1 shows a welding system 2 with a switching type power source 4 and an automatic wire feeder 6 having a welding torch 8 coupled thereto via a torch cable 10 through which power and welding electrode wire are provided to a welding operation (not shown), where power source 4 is generally of the type shown in the above Blankenship and Hsu patents and as sold by the Lincoln Electric Company under the trademark POWER WAVE and feeder 6 can be one of the POWER FEED line of wire feeders sold by Lincoln Electric. In accordance with the teachings of Hsu U.S. Pat. No. 6,002,104, a portable laptop computer 12 is coupled to a communications port 14 of power source 4 using a serial communications cable 16, and a template or predefined waveform is displayed on a display screen 12a of computer 12. An operator (not shown) uses a keyboard 12b and/or a mouse 12c of computer 12 to make desired changes to the waveform or associated values rendered on display 12a and the updated waveform information is sent to power source 4, which implements the changes to the internal waveform controls therein.

The microprocessor based controller of this Hsu patent provided an operator with a displayed waveform to be processed by the power source 4 under the direction of the patented controller, as well as a keyboard 12b and/or mouse 12c for adjusting the waveform to generate a new waveform having the desired control parameters. A predefined waveform was first displayed, such as a current/voltage/power/RMS current/Joules/Travel speed vs. time graph, and a manual adjustment of the predefined waveform was performed interactively on a waveform display screen 12a using keyboard 12b and/or mouse 12c. In this manner, a new current waveform was exhibited on the display screen 12a. A pulse width modulator (not shown) of the switching power source 4 was controlled in accordance with the newly created waveform to cause the power source 4 to generate a welding cycle with the real time output corresponding to the new waveform on the waveform screen 12a. In this fashion, if a change was desired for a control parameter of the exhibited waveform, the waveform itself was modified visually by the operator using the mouse 12c and/or keyboard 12b of computer 12 connected to the welding system 2; where the interactive waveform modification of Hsu U.S. Pat. No. 6,002,104 was novel to the welding field and was implemented by including a JAVA virtual machine with a welder control application program or an applet running within a browser in JAVA language.

The microprocessor system of Hsu U.S. Pat. No. 6,002,104 included hardware with a first interface for an interactive display screen 12a and a second interface for a mouse 12c or keyboard type data entry device 12b for changing the displayed waveform prior to the waveform being transferred via cable 16 for providing control parameters to the welder 4, where the same communication channel was used to input operating parameters from the welder 4. When the operating parameters from welder 4 were inputted to computer 12, a separate "scope" application program in JAVA language was selected and implemented, whereby display 12a was converted from a waveform editor to an oscilloscope display for reading parameters from the welder 4 and for displaying these parameters as a soft oscilloscope on display 12a.

In the prior art electric arc welder patented in Hsu U.S. Pat. No. 6,002,104, the processing logic was fixed and inflexible so that only certain types of waveforms pre-built into the program could be processed. For instance, a wave shape template was selected for display and manipulation, wherein the basic aspects of the template were fixed logic. Thus, the welder with a JAVA virtual machine could only select fixed templates for processing of specific welding waveforms, with limited ability to select from a memory location certain data and to display this as a waveform in a manner to change the behavior of the waveform template. In the prior art unit, the weld program compiled as object code or bytecodes was fixed to manipulate a fixed waveform logic.

Hsu U.S. Pat. No. 6,700,097 provided improvements, in which a series of script language files written by script language presented waveforms graphically from a subset of parameters, constraints and display characteristics of the parameters. By using the script language or script files, the user variables and graphic constraints were directly processed by a graphic user interface (GUI) computer platform including a JAVA virtual machine, and the relationship of the user variables were converted to data understood by the welder. As a result, the patented improvements of Hsu U.S. Pat. No. 6,700,097 provided a user friendly programming digital welding system using script to draw any waveform, rather than an operating program with pre-built waveforms. In this Hsu patent, the welding waveform script file was compiled into a JAVA object code in the form of bytecodes, which were then processed at run time by the main operating JAVA program, wherein the controller program was fixed, stable, and independent of the logic of each welding process. Hsu U.S. Pat. No. 6,717,108 provides waveform design methods to ensure that the waveforms conform to a desired implementation of a welding process. Another improvement was provided in Hsu U.S. Pat. No. 6,734,394, in a patented system for creating an actual welder output waveform via a waveform generator, with a display and customizing screen to design a commanded waveform for processing by the waveform generator. The above presents the general state of waveform control technology and the design of welding waveforms forming a background to the present invention.

SUMMARY OF INVENTION

One or more aspects of the invention are hereinafter summarized in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to the design of output waveforms for switching type welding power sources and configuration files for welding sequence controllers in which touch screen-based graphical user interfaces and methods are provided to allow a user to easily adapt template waveforms and to design new waveforms from scratch, which may then be used in advanced switching power sources in order to tailor the welder output to a given welding process application and/or to set the behavior of one or more welding system components during a welding operation by configuring a welding system sequence controller.

One aspect of the present invention provides a welding system with a switching power source and a programmable waveform generation system providing a switching control signal to the power source in accordance with a desired waveform, as well as a waveform design apparatus operatively coupled with the waveform generation system. The waveform design apparatus can be integrated into the welder power source, a wire feeder, a sequence controller, or other welding system component, and includes a touch screen display that visually renders waveform information associated with the desired waveform along with one or more touch activation indicia, such as buttons, scroll bars, points on a visually rendered waveform graph, etc. The waveform design apparatus allows a user to modify the desired waveform of the waveform generation system, numerically, graphically, or combinations thereof, by touching the touch activation indicia on the display screen. For numeric waveform modifications, the touch screen displays one or more numeric or Boolean values associated with the desired waveform, with the touch activation indicia allowing the user to change the value to modify the desired waveform. The touch screen display may be further adapted, to graphically display a waveform representative of the desired waveform, together with one or more graphical touch screen activation indicia allowing one or more points on the displayed waveform to be changed, such as by dragging a waveform point, in order to modify the desired waveform. The apparatus may also obtain and display actual waveform data from the power source, including but not limited to amps, volts, power, energy (e.g., kJ/in.), travel speed, numerically and/or graphically, in order to operate as a virtual oscilloscope so that the user can study the actual welding operation graphically, as well as error messages and setup information. The system may also include a sequence controller providing control signals to the power source other system components in accordance with a sequence file, with the touch screen display being operable to display sequence information associated therewith, where the design apparatus may also allow the user to modify the sequence file using one or more touch activation indicia on the touch screen display.

Another aspect of the invention provides a welding system having a switching power source operable to provide an electrical welding signal according to a switching signal, a programmable waveform generation system providing the switching signal according to a desired waveform, and a sequence controller providing control signals to the power source and to at least one other welding system component in accordance with a sequence file. The welding system further includes a sequencer configuration apparatus with a touch screen display adapted to display information associated with the sequence file, as well as touch activation indicia for modification of the sequence file by the user, where the configuration apparatus may be integrated into a welding system component such as the power source, a wire feeder, the sequence controller, etc. The touch screen display may be adapted to display numeric and/or Boolean values associated with the sequence file and the touch activation indicia allows the user to change the values to modify the sequence file. Alternatively or in combination, the touch screen may graphically display a sequence waveform associated with the sequence file, with the touch screen activation indicia allowing the user to change the displayed sequence waveform to modify the sequence file.

Yet another aspect of the invention provides a touch screen-based welding system configuration tool that comprises a touch screen display integrated into a welding system component, such as a welding power source, a welding wire feeder, a sequence controller, etc., where the touch screen displays information related to a switching type welding power source and/or to a welding system sequence controller.

The touch screen also provides one or more touch activation indicia and the configuration tool allows the user to program the power source and/or the sequence controller by touching the touch activation indicia to modify displayed numeric or Boolean values and/or to change a displayed waveform graph.

Still another aspect of the invention provides a method for configuring a welding system, in which information is rendered on a touch screen display relating to a programmable switching type welding power source and/or to a welding system sequence controller along with at least one touch activation indicia on the touch screen. The method also includes allowing a user to modify the rendered information by touching the touch activation indicia on the touch screen display, and configuring the power source and/or sequence controller according to the modified information, where the information rendering and modification may be numeric and/or graphical.

BRIEF DESCRIPTION OF THE DRAWINGS

The following description and drawings set forth certain illustrative implementations of the invention in detail, which are indicative of several exemplary ways in which the principles of the invention may be carried out. Other objects, advantages and novel features of the invention will become apparent from the following detailed description of the invention when considered in conjunction with the drawings, in which.

DETAILED DESCRIPTION OF THE INVENTION

Figure 1:
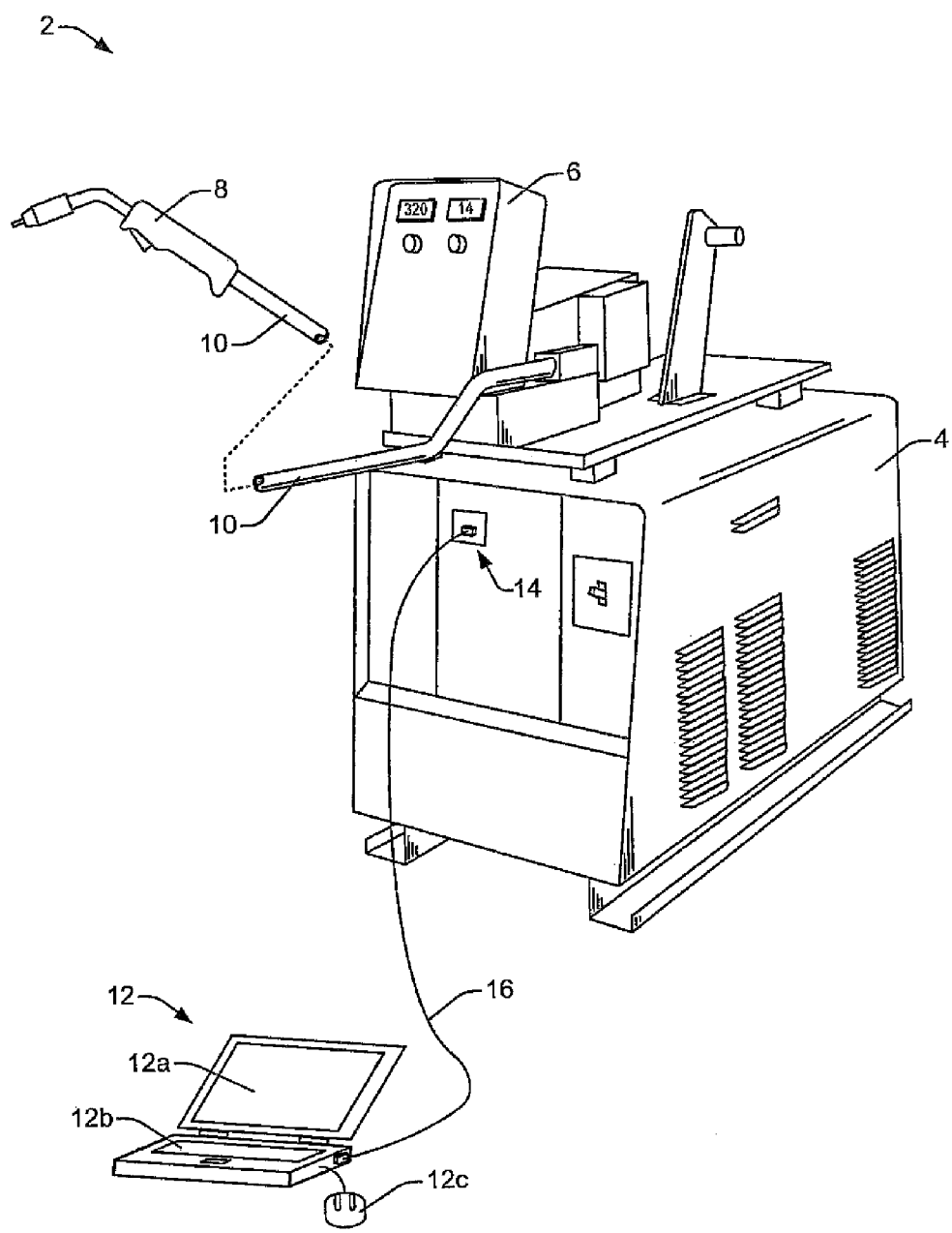
FIG. 1 is a perspective view illustrating a conventional welding system with a switching power source and an automatic wire feeder, with a laptop computer coupled to the power source for programming the output waveform thereof.

One or more embodiments or implementations of the present invention are hereinafter described in conjunction with the drawings, wherein like reference numerals are used to refer to like elements throughout and wherein the illustrated structures are not necessarily drawn to scale. The invention relates to programming or configuring welding system components such as switching power sources and/or sequence controllers and touch screen-based configuration or design tools therefor, the various aspects of the invention are generally applicable to welding systems, which as used herein, refers to systems that may be used to perform welding operations, cutting operations (e.g., plasma cutters, etc.), or other forms of arc processing. Thus, while illustrated and described below in the context of specific welders, the invention is not limited to the illustrated examples.

Figure 2:
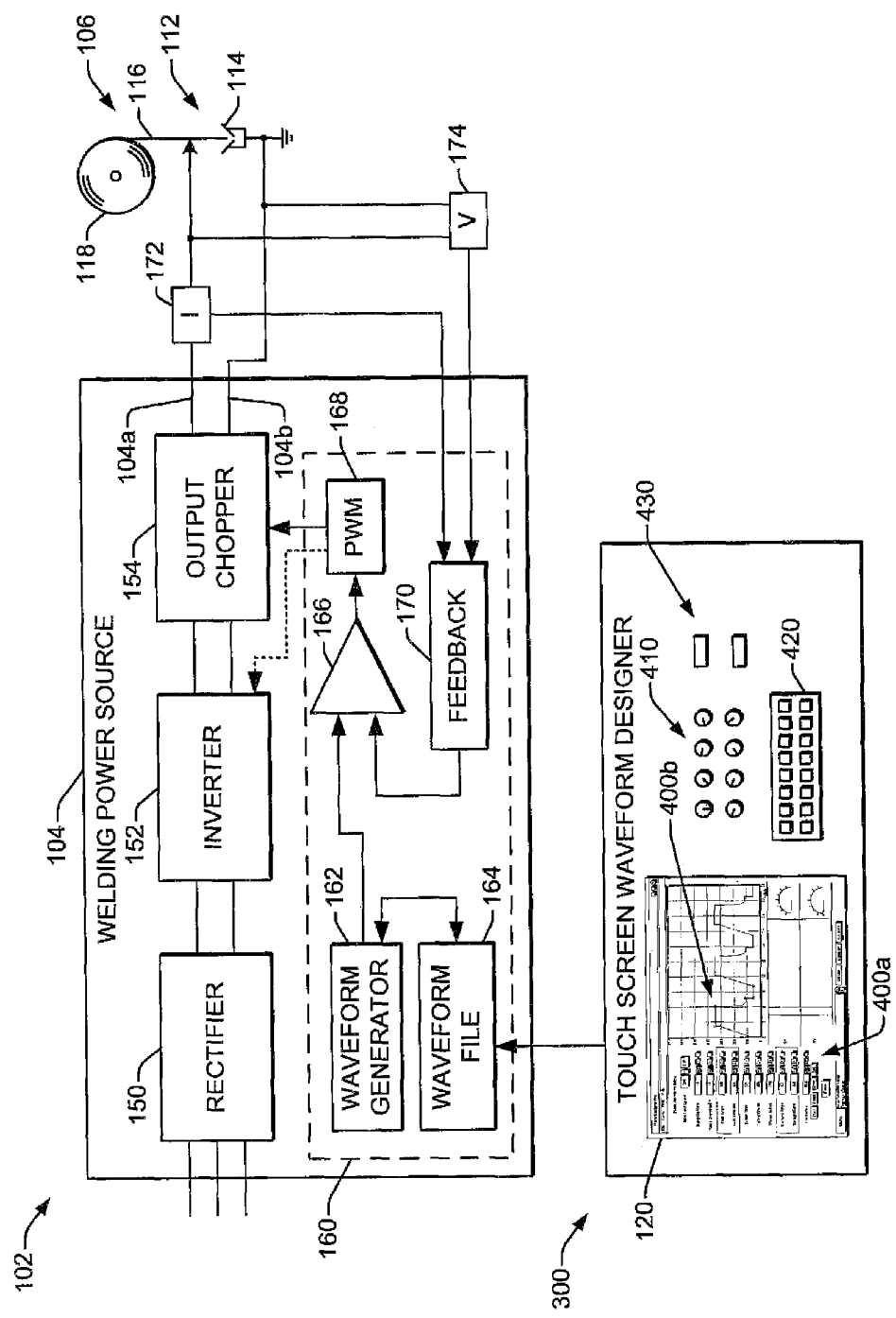
FIG. 2 is a simplified schematic diagram illustrating a switching type welding power source providing a welding signal according to a switching signal from a programmable waveform generation system, with a touch screen-based waveform design apparatus operatively coupled with the waveform generation system in accordance with one or more aspects of the present invention.
Figure 3A:
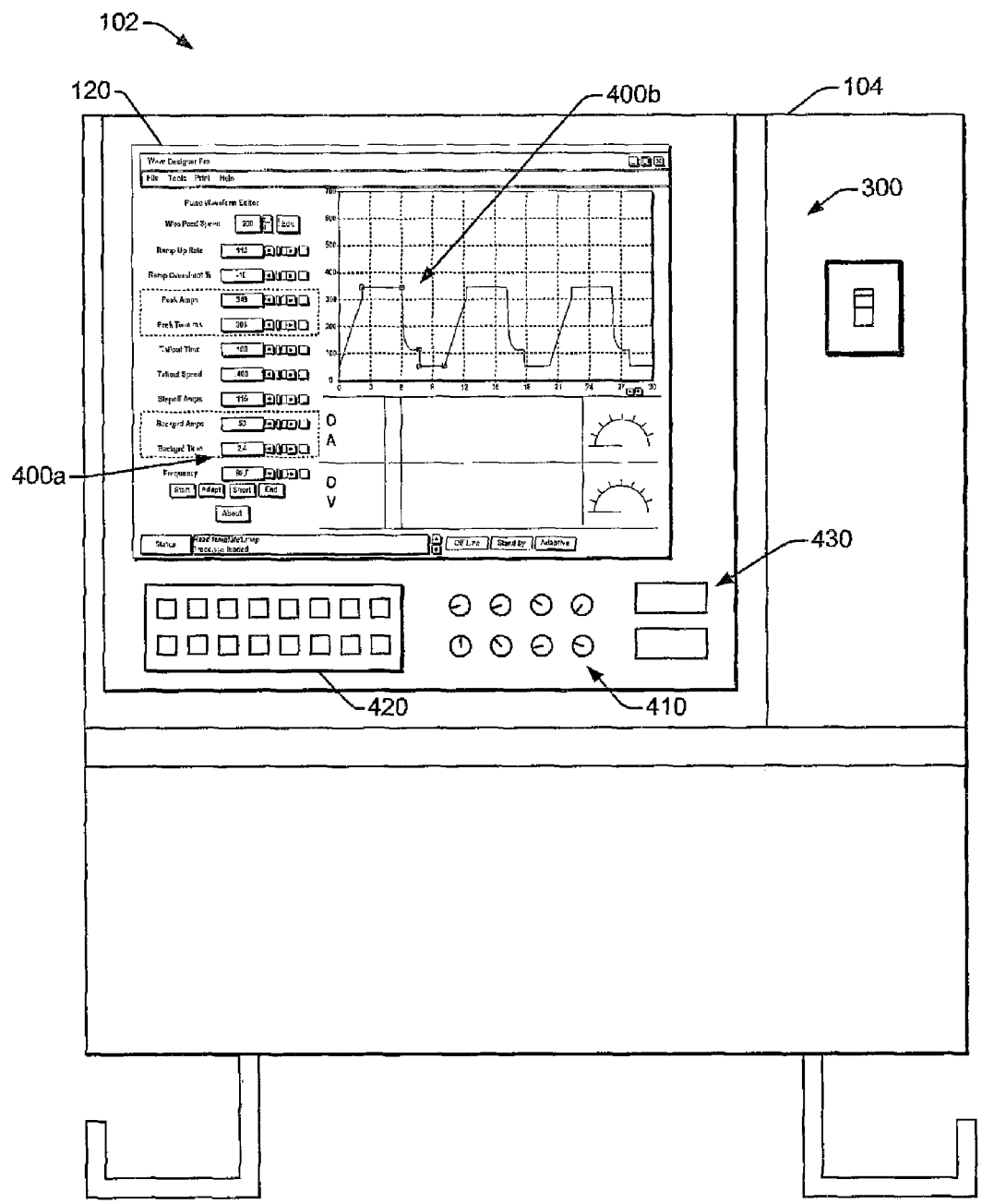
FIG. 3A is a front end elevation view illustrating an exemplary touch screen-based configuration tool integrated into a switching type welding power source in accordance with the invention.
Figure 3B:
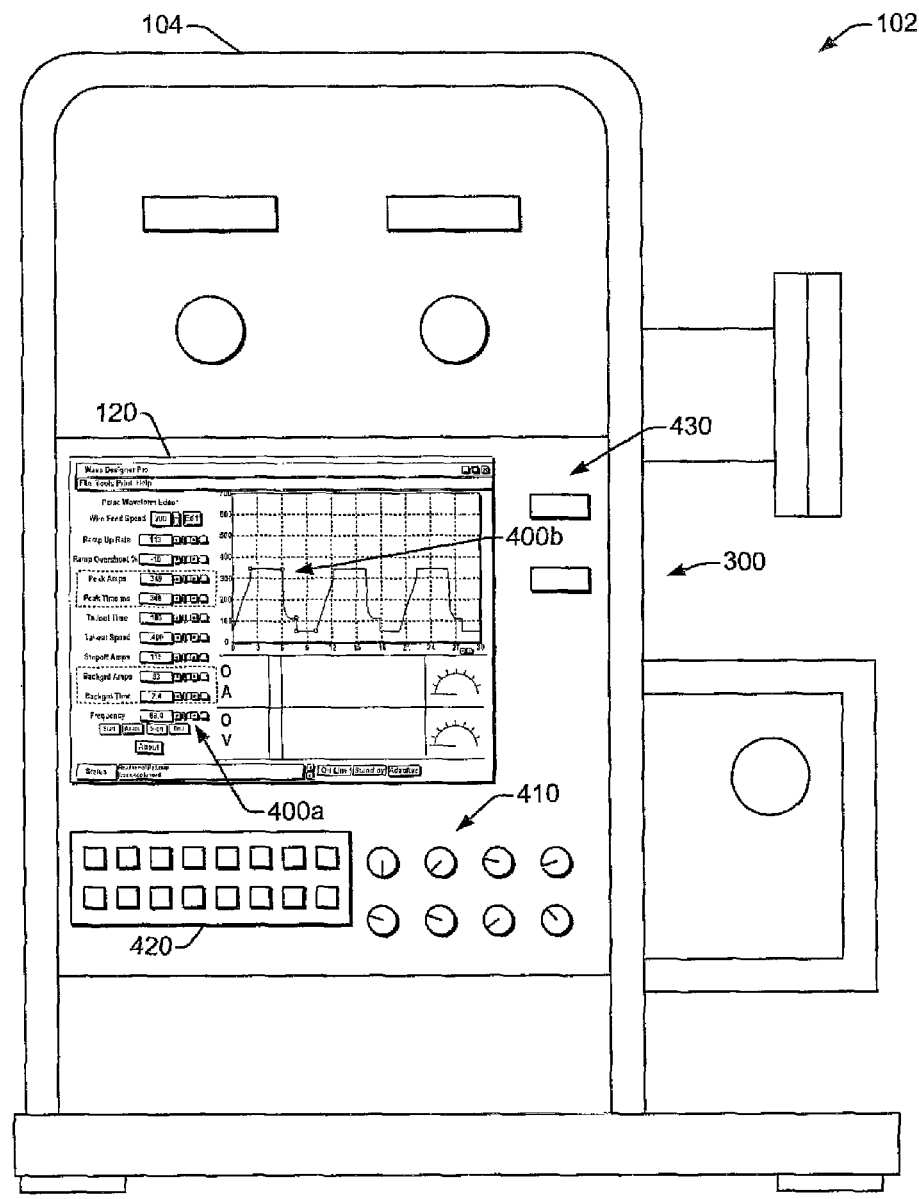
FIG. 3B is a front end elevation view illustrating an exemplary touch screen-based configuration tool integrated into a welding system wire feeder in accordance with the invention.
Figure 3C:
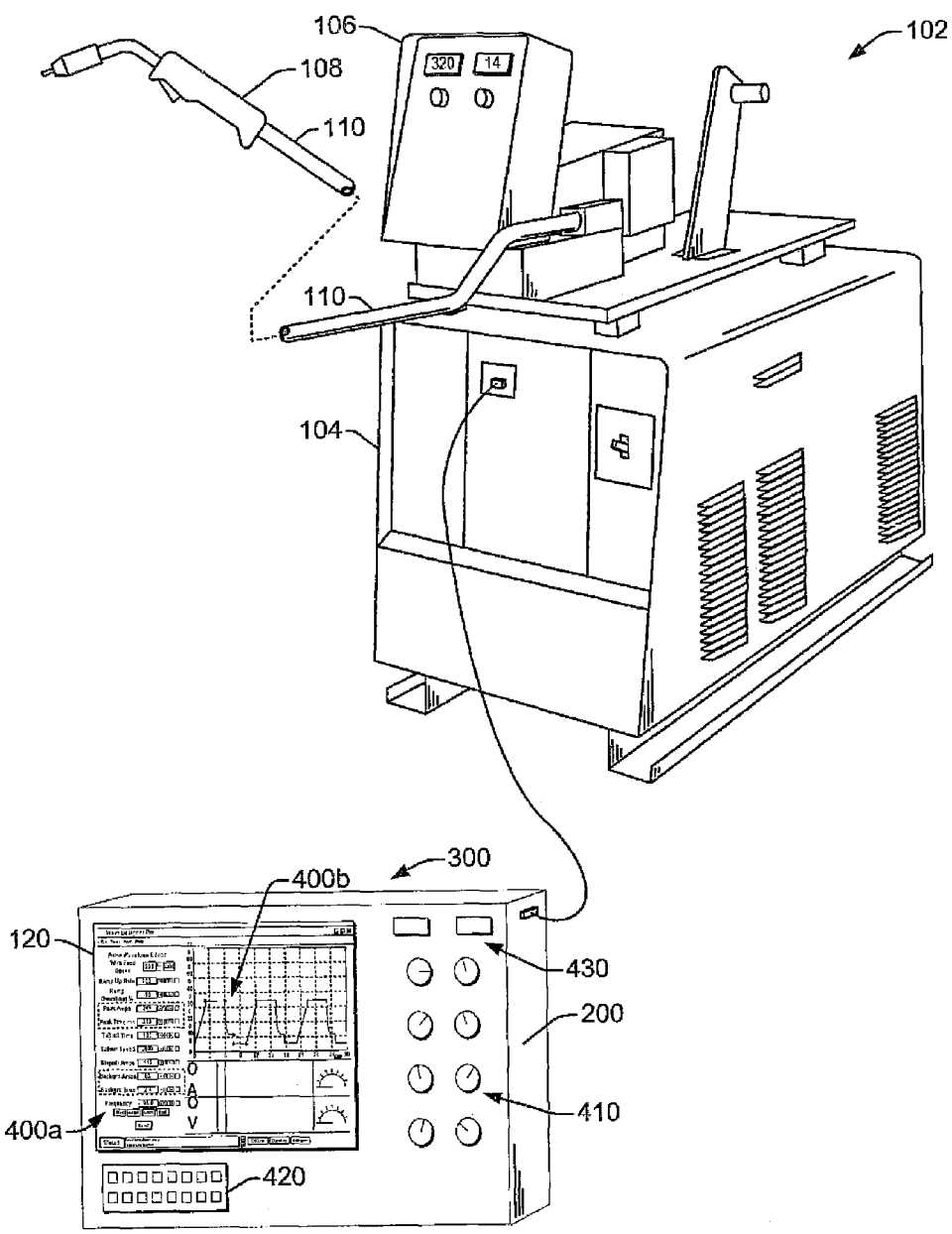
FIG. 3C is a perspective view illustrating an exemplary touch screen-based configuration tool integrated into a welding system sequence controller in accordance with the invention.
Figure 4:
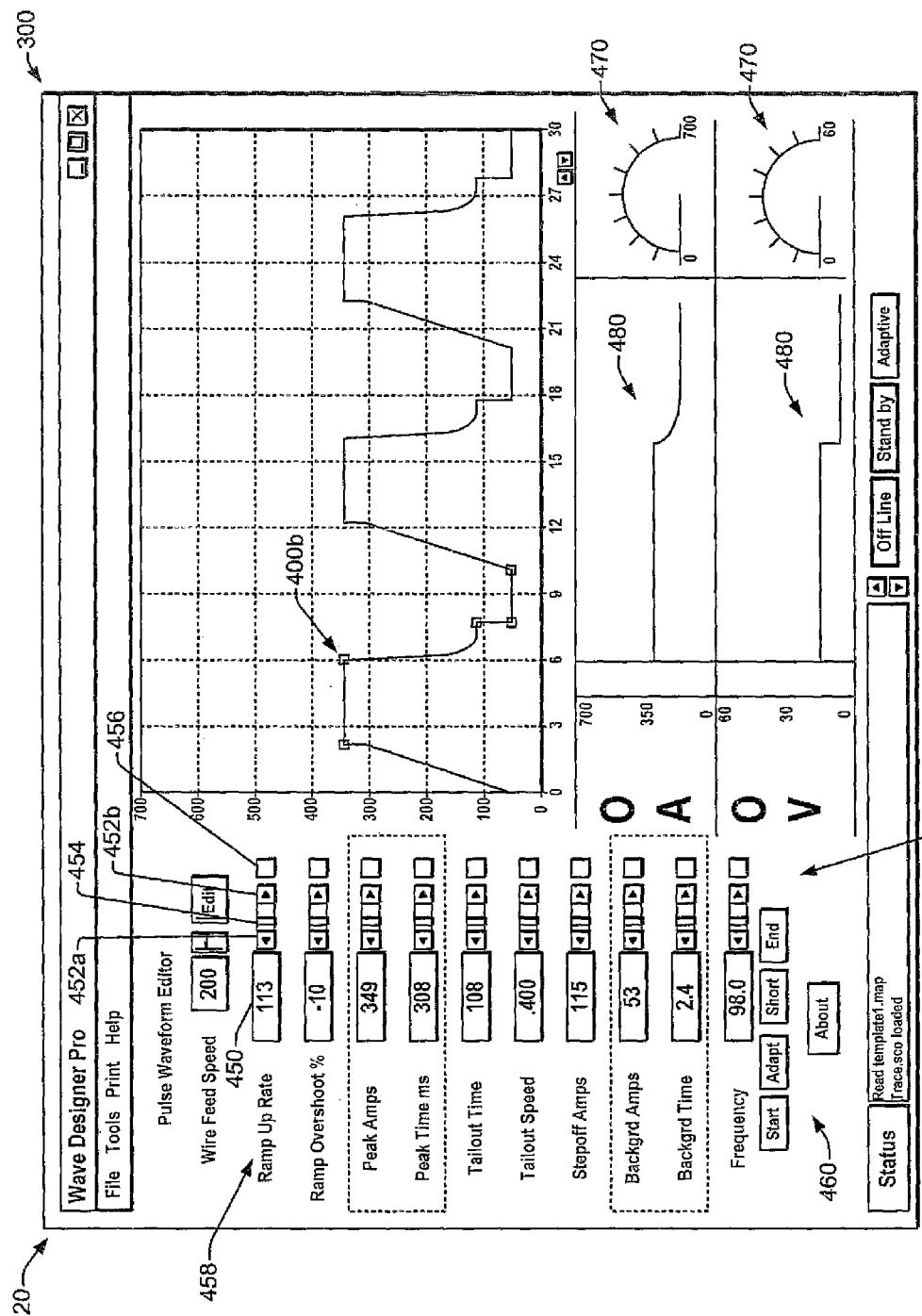
FIG. 4 is a detailed front elevation view illustrating an exemplary touch screen display rendering numeric and graphical information relating to a desired waveform of a switching type welding power source according to the invention.

FIGS. 2-4 show an exemplary welding system 102 with a programmable switching type welding power source 104 operable to provide an electrical welding signal (e.g., voltage, current) to a welding process 112. In the illustrated system 102, power source 104 provides welding current for welding a workpiece 114 using a welding wire electrode 116 provided to the process 112 from a supply reel 118 (FIG. 2) via a wire feeding apparatus 106 (FIG. 3C) for processes such as GMAW, FCAW, MCAW, SAW (processes such as SMAW or GTAW do not require reel 118), where the welding current and wire 116 are transported to process 112 through a welding torch 108 and a welding cable 110 (FIG. 3C), with the current forming a welding arc (not shown) between the advancing electrode 116 and workpiece 114 to controllably melt electrode material for deposition onto a weld joint. System 102 further includes a sequence controller 200 that is operatively coupled to power source 104, wire feeder 106 and other system components to receive input signals therefrom and to provide control outputs thereto for controlling operation of system 102 in a welding operation.

As best shown in FIG. 2, power source 104 can be any switching type welding power source that provides an electrical welding signal according to one or more switching signals, where the exemplary source 104 is generally of the type shown in Blankenship U.S. Pat. No. 5,278,390 and Hsu U.S. Pat. No. 6,002,104 incorporated by reference above and as sold by the Lincoln Electric Company under the trademark POWER WAVE. Power source 104 includes a rectifier 150 receiving single or multiphase AC input power and providing a DC bus output to a switching inverter 152, which in turn drives an output chopper 154, where chopper 154 and inverter 152 are operated according to switching signals from a pulse width modulation (PWM) switching control system 168 to provide a welding output signal at terminals 104a and 104b suitable for application to welding operation 112. In practice, terminals 104a, 104b may be coupled through a power source cable 104c (FIG. 5) to wire feeder 106 for ultimate provision of the welding signal to welding operation 112 through torch 108 and cable 110, where welding current and voltage sensors 172 and 174 are provided to create feedback signals for closed loop control of the welding signal applied to the process 112. Power source 104 also includes a waveform generation system 160 providing switching signals to the output chopper 154 and optionally to inverter 152, where system 160 comprises a waveform generator 162 providing a desired waveform control signal to an input of a comparator 166 according to a selected desired waveform 164, stored as a file in one example. The desired waveform is compared to one or more actual welding process conditions from a feedback component 170 and the comparison is used to control the PWM switching system 168 to thereby regulate the welding signal in accordance with the desired waveform. In the illustrated embodiment, the waveform generation system 160 and the components thereof are implemented as software or firmware components running in a microprocessor based hardware platform; although any suitable programmable hardware, software, firmware, logic, etc., or combinations thereof may be used in accordance with the invention, by which one or more switching signals are created (with or without feedback) according to a desired waveform, and wherein a switching type power source 104 provides a welding signal according to the switching signal(s). As shown in Blankenship U.S. Pat. No. 5,278,390, the illustrated power source 104 is a state table based switching power source that may receive as inputs one or more outputs from sequence controller 200 (FIG. 3C), wherein waveform generation system components 162, 166, 170 may be implemented as a waveform control program running on or executed by a microprocessor (not shown) that defines and regulates the output waveform of power source 104 by providing control signals via PWM system 168 to inverter 152 and/or chopper 154, where the output waveform can be a pulse type, a steady state value (e.g., for constant voltage (CV) control), or any other form, and may provide for alternative current polarities (AC).

Sequence controller 200 of FIG. 3C may also provide control signaling to wire feeder 106 to control the wire feed speed or other operating parameters of feeder 106 or travel speed, and controller 200 also provides control or command signals (e.g., electrical signals, messages, etc.) to any number of components in welding system 102 and receive inputs therefrom. In this manner, sequencer 200 provides for implementation of an entire weld sequence or welding operation 112 to coordinate operation of the various system components. In this respect, as further shown in FIG. 5, welding system 102 may include any number of components beyond power source 104, wire feeder 106, and sequencer 200, including a gas solenoid 210 to control the flow of shielding gas to welding operation 112, a coolant system with a control solenoid 212 for providing cooling fluid to liquid cooled welding torches 108, a travel carriage system 214 for movement of the workpiece 114, the welding torch 108 or other structures during the operation, and other system components 216 such as water/gas flow sensors, travel sensors, etc. (not shown). With respect to the power source 104, sequence controller 200 may provide an overall desired workpoint value, such as voltage or current value, to which the power source 104 will attempt to regulate the actual welding output signal, wherein the desired signal value or level is used as an input to the waveform generation system 160. The waveform generation system 160, in turn, may generate specific wave shapes for the output signal, for example, using the sequencer output as an amplitude value.

In accordance with one or more aspects of the invention, a touch screen-based welding system configuration tool 300 is provided in system 102, including a touch screen display 120, where tool 300 and/or touch screen 120 may be integrated into a welding system component, such as power source 104 (FIG. 3A), wire feeder 106 (FIG. 3B), sequence controller 200 (FIG. 3C), etc. In this regard, one or more of the illustrated components of system 102 may be integrated with one another, for example, where sequence controller 200 itself may be integral to wire feeder 106 or power source 104, or wire feeder 106 and power source 104 may be housed in a single enclosure, wherein the illustrated components are merely examples shown as separate components. Touch screen display 120 is operative to display information related power source 104 and/or sequence controller 200, and displays one or more touch activation indicia 400 allowing a user to modify graphical or numeric renderings of the information so as to program power source 104 or sequencer 200 by touching the touch activation indicia 400 on the display 120.

In particular, buttons, scroll bars, and other numeric type touch activation indicia 400a are provided allowing a user to touch designated portions of the display screen 120 to cause changes to or modification of numeric or Boolean values associated with the programmable power source 104 and/or the sequencer 200, and graphical touch activation indicia 400b may be provided to allow the user to graphically modify a rendered waveform or other graphical rendering, in order to program the system components 104 and/or 200. In this manner, the invention provides for touch screen-based configuration of one or more welding system devices. The tool 300, moreover, may optionally include further physical user interface apparatus, for example, such as knobs 410, a keyboard or other buttons 420, character displays 430, pointing devices such as track balls, mice, light pens, etc. (not shown).

As best shown in FIGS. 2 and 4, the tool 300 may be operated as a waveform design apparatus for setting, configuring, or otherwise programming the desired waveform file 164 of the waveform generation system 160. In this manner, the touch screen-based tool 300 allows a user to perform waveform design or modification directly, even in harsh industrial environments, to adapt the programmable waveform control technology of advanced programmable switching type welding power sources, such as those described in Blankenship U.S. Pat. No. 5,278,390, without having to provide a portable laptop computer loaded with software tools. In this regard, the touch screen display 120 may be any suitable device that allows touch activation of one or more touch activation indicia rendered on a visual display, and in one preferred implementation, the touch screen display 120 may be environmentally hardened, such as capable of NEMA 4 rating, for example, whereby continued use in typical welding conditions will not adversely affect the operation of the display 120 as a visual rendering device or as a touch activation medium. Moreover, the use of the touch screen 120 may advantageously enable or facilitate on-site welding system reconfiguration in environments that would not be suitable for ordinary laptop or desktop computers. Security means may also be provided in the tool 300, such as password protection, etc., for selectively allowing or preventing access by authorized/unauthorized personnel, and intelligent prompting and value limits may be used, for instance, as discussed in the Hsu and Blankenship patents incorporated herein.

In FIGS. 3A-4, an exemplary composite numeric and graphical rendering of various pulse waveform design parameters and a corresponding welding current waveform are illustrated, including numeric readout windows or values 450 for wire feed speed, ramp up rate, ramp overshoot percentage, peak amps, peak time, tailout time, tailout speed, stepoff amps, background amps, background time, and waveform frequency. While the examples shown in FIG. 4 include displayed number values 450, Boolean values may also be rendered, wherein all such values 450 are termed numeric herein. In this instance, one or more of the displayed values 450 are rendered in numeric display fields 450 having corresponding numeric touch activation indicia 400a, such as button indicia 452 for decreasing or increasing the displayed value (e.g., left facing arrow indicia 452a for lowering and right facing arrow indicia 452b for raising the value 450), and a scroll bar type indicia 454 with which a user can change the value (e.g., lateral scroll bar indicia in the illustrated display 120 of FIG. 4). In the exemplary implementation, moreover, touch actuatable lock window indicia 456 are provided for locking certain displayed values, wherein a textual description field 458 may also be provided for displayed values 450. In general, the configuration tool 300 operates interactively with the user to allow creation and/or modification of a power source desired waveform 164 to configure the switching power source 104, wherein one suitable implementation of the visual and control interface renderings includes the WaveDesigner line of software products available from the Lincoln Electric Company of Cleveland, Ohio, wherein the power source output waveform (e.g., current, voltage, etc.) is visually edited or modified by merely interactively moving points and bars on the waveform by, in this case using one or more touch activation indicia 400 to change various operational parameters or aspects of power source 104. In addition to numeric value renderings and associated touch activation indicia 400a, the exemplary touch screen display 120 also provides for graphical rendering of a corresponding waveform (e.g., current waveform shown in FIG. 4), where the displayed read out values 450 correspond to the illustrated graphical waveform rendering and vice versa. Furthermore, the display 120 includes one or more graphical touch activation indicia 400b located at certain points in the displayed waveform, which a user can select and move in order to modify the displayed waveform and the corresponding numeric values. In this manner, a user can modify the displayed values and/or waveforms, wherein the tool 300 operates to make corresponding modifications to the associated desired waveform file 164 in the waveform generation system 160 of power source 104, for example, by downloading a new file 164 to source 104 and/or by sending appropriate messages to power source 104 by which the file 164 is modified. In this manner, changes to the displayed values 450 using numeric indicia 400a result in updating of both the rendered value 450 and the displayed waveform and graphical modification of the waveform using indicia 400b operates to change any affected displayed values 450. In addition, one or more button type touch activation indicia 460 may be provided to allow a user to control modes or other operations of tool 300 and the user interface thereof.

The waveform design apparatus 300 and touch screen display 120 thereof thus allow a user to modify the desired waveform 162 of waveform generation system 160 in a user-friendly visual environment by simply touching one or more touch activation indicia 400. With respect to power source 104 and the output waveforms thereof, moreover, configuration tool 300 may also be adapted to obtain actual waveform data from power source 104 (e.g., current and/or voltage feedback information from feedback component 170 in FIG. 2), with touch screen display 120 being operative to graphically display the actual waveform data, for example, in graphical form and/or using graphical meter renderings 470 and/or other graphical plots 480. In the example of FIG. 4, for instance, the output current and voltage plots 480 are of a much longer time scale than the waveform display, whereby the user can observe the overall peak or average values on the renderings 480 while also viewing the finer details of the waveform, where the waveform rendering can concurrently display the desired or ideal waveform shape as well as a real time oscilloscope type waveform display for comparative analysis. Furthermore, the tool 300 may also provide for loading of predefined waveform templates, and/or uploading of desired waveform information from other power sources, for example, where the tool 300 is operatively coupled to a network of welders or by other suitable means, wherein the externally provided waveform can then be modified in the tool 300 for use in the associated power source 104.

Figure 5:
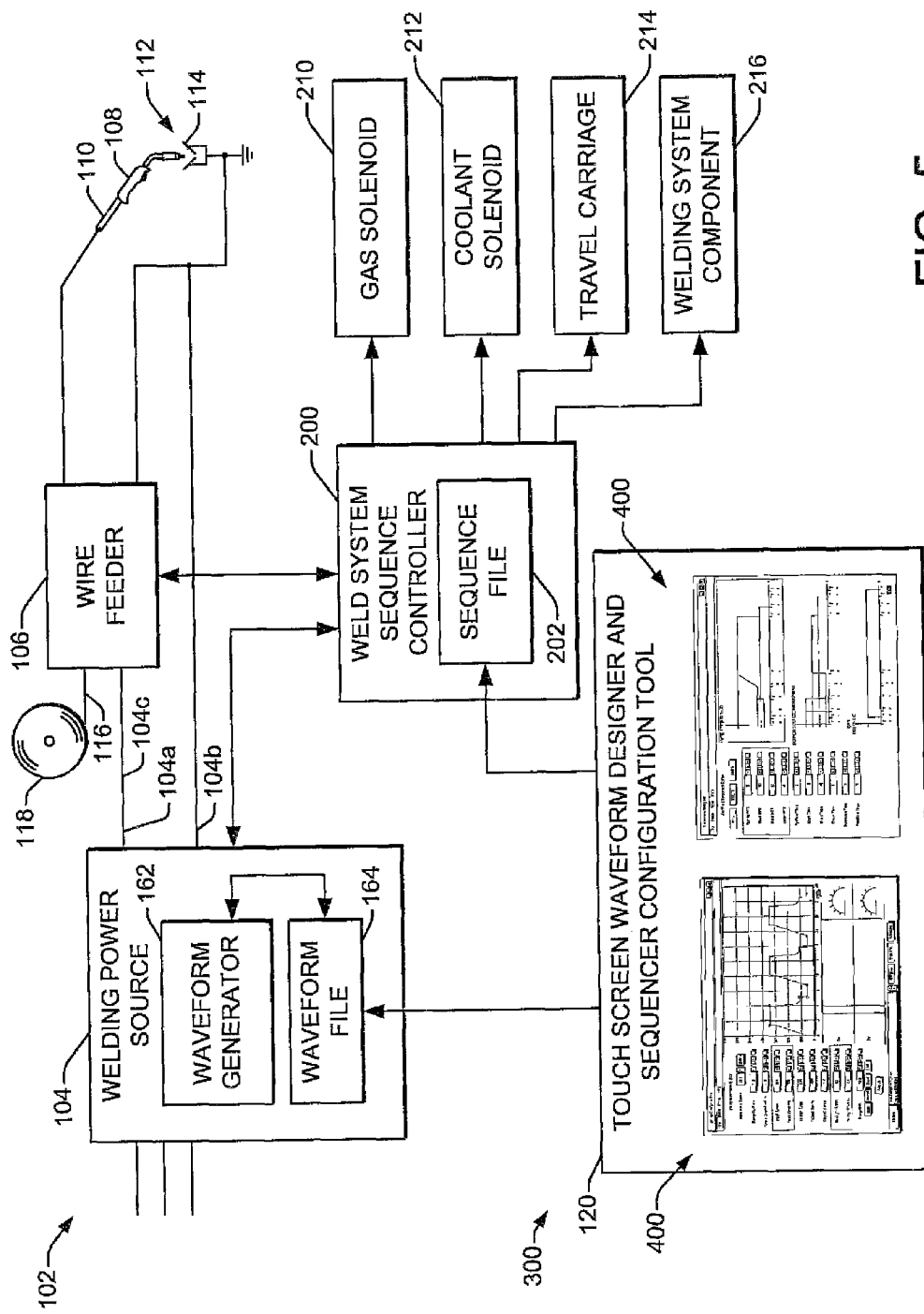
FIG. 5 is a simplified system diagram illustrating an exemplary touch screen-based waveform designer and sequencer configuration tool in a welding system in accordance with the invention.
Figure 6A:
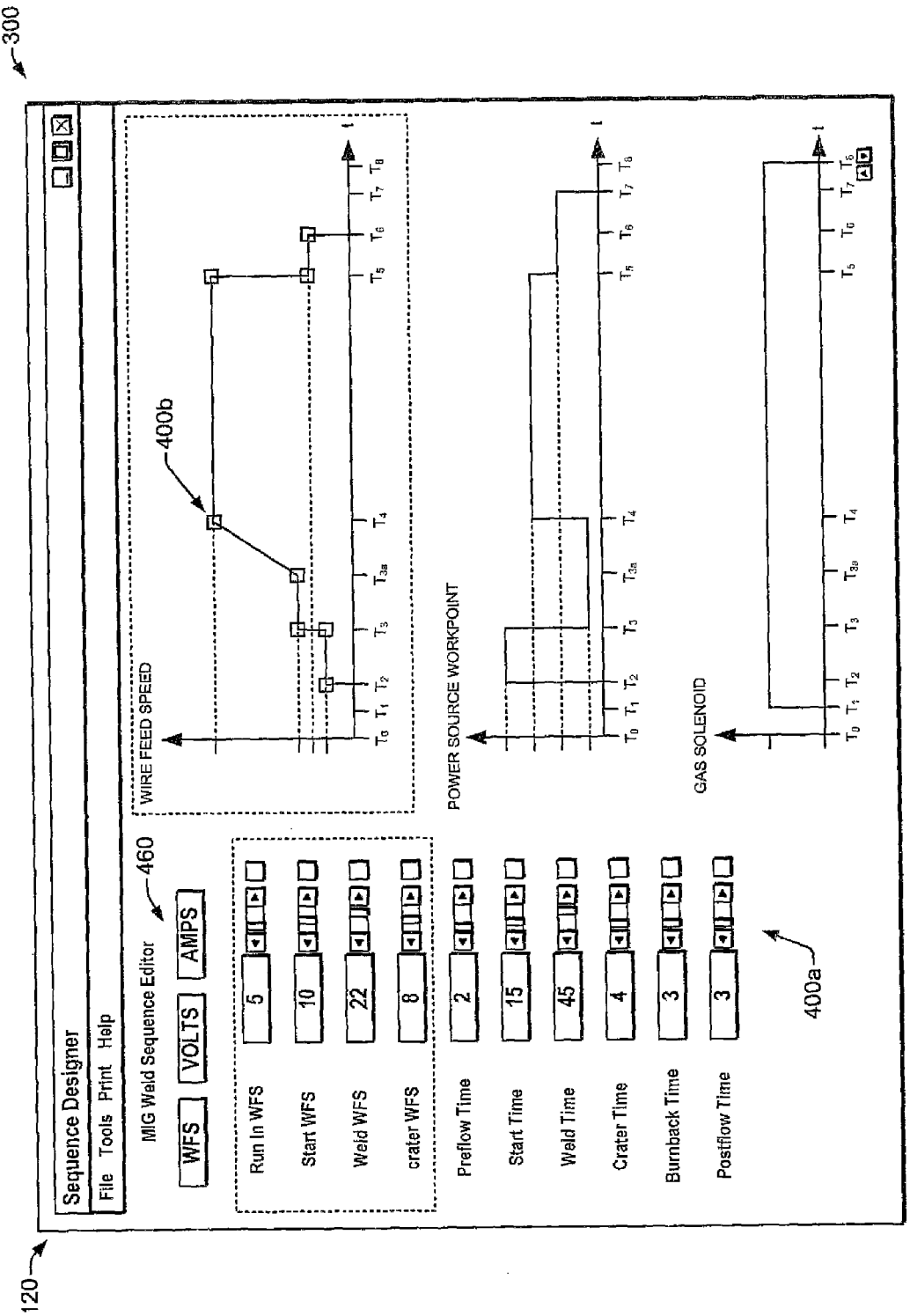
FIGS. 6A and 6B are detailed front elevation views illustrating an exemplary touch screen display rendering numeric and graphical information relating to a welding sequence file according to the invention.
Figure 6B:
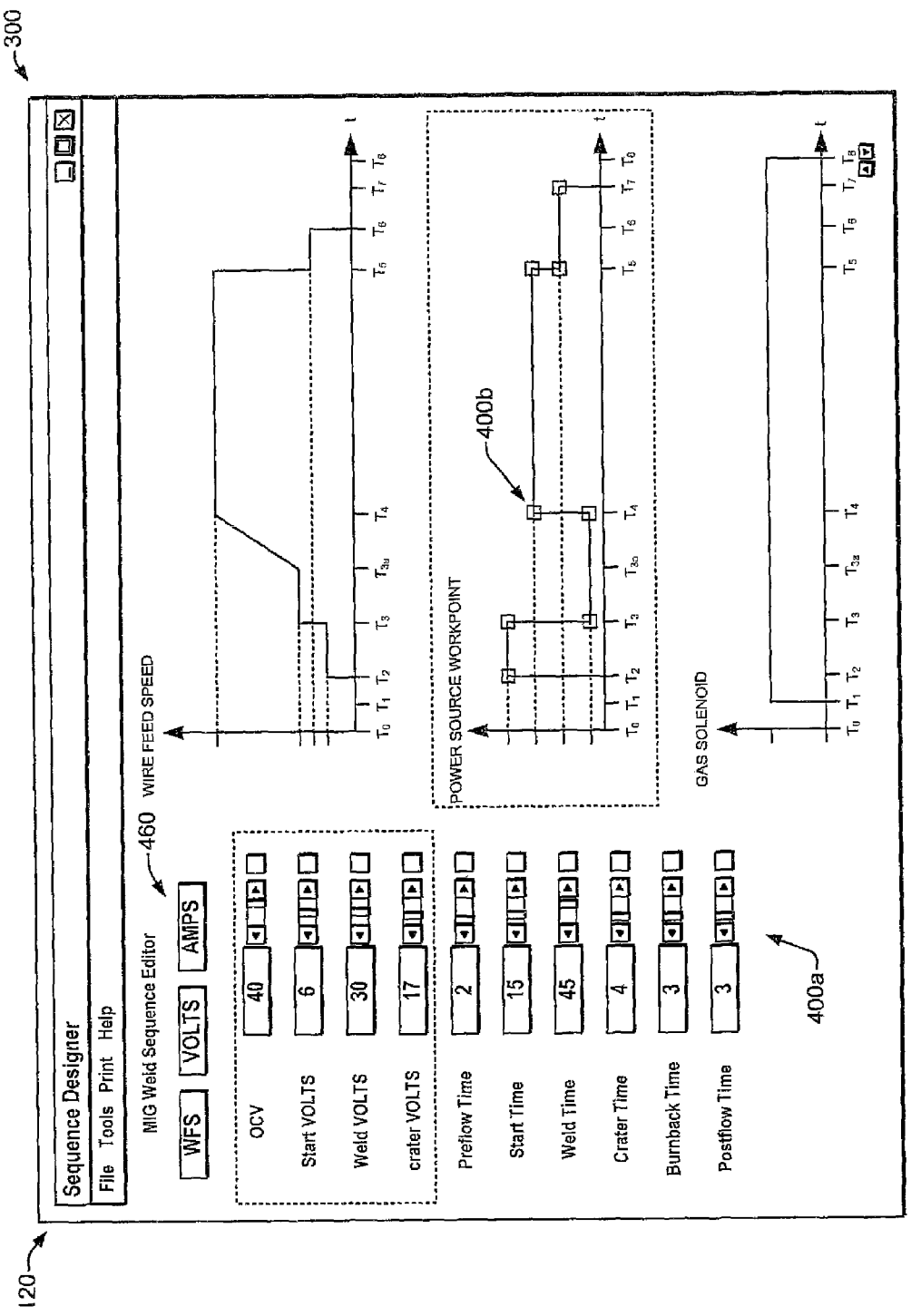

Referring also to FIGS. 5-6B, the invention also provides for configuration of programmable welding system sequence controller apparatus, such as sequencer 200 of FIG. 3C. In this respect, touch screen display 120a is operative to graphically and/or numerically render sequence information associated with a sequence file 202 of sequence controller 200 (FIG. 5) with waveform design apparatus 300 allowing the user to modify sequence file 202 by touching the touch activation indicia 400. In this implementation, tool 300 operates as a sequencer configuration apparatus operatively coupled with the sequence controller 200, where tool 300 and sequencer 200 may be operatively coupled by any suitable means. In one implementation, sequence controller 200 is a state table based control device operational to control an overall welding sequence according to a selected sequence file 202, which can be any data and/or information related to a sequence of events in a welding operation, and which can be stored in any fashion, for example, as a data file in memory. The configuration apparatus 300 is operable to display numeric values (e.g., numbers and Boolean) and/or graphs illustrating operating points for one or more components of welding system 102, and display 120 provides suitable touch activation indicia 400 allowing the user to interactively modify the sequence file by changing values numerically or graphically, wherein apparatus 300 then causes the sequence file 202 to be updated or overwritten accordingly. In this regard, the illustrated tool 300 and display 120 thereof can alternatively or concurrently be used to monitor and/or configure both the power source 104 and sequence controller 200, although this is not a strict requirement of the invention. In this manner, the system wide welding operation can be adapted on-site without the need for external programming devices (e.g., laptop computers, etc.), and without requiring ideal environmental conditions. Moreover, the tool 300 can provide for predefined templates and/or for uploading sequence configuration information from other networked sequence controllers. Furthermore, real time sequencer input information can be rendered using the apparatus 300, so as to verify desired operation of a given welding system 102 and/or for comparing the desired and actual operation using simultaneous renderings of numeric and/or graphical sequence information.

FIGS. 6A and 6B illustrate touch screen display 120 numerically and graphically rendering sequence file information for an exemplary metal inert gas (MIG) welding operation 112, including numeric values and touch activation indicia 400a related to control of welding wire feed speed (WFS), power source output workpoint (e.g., welding voltage in one example), and control of a shielding gas solenoid 210 in welding system 102. Touch screen 120 also displays one or more sequence waveforms associated with sequence file 202 together with one or more touch screen activation indicia 400b allowing the user to change the displayed sequence waveform to modify the sequence file 202. In addition, several button type touch activation indicia 460 are provided, whereby the user can select a particular waveform to modify. As shown in FIG. 6A, for example, actuation of the indicia 460 labeled "WFS" causes graphical touch activation indicia 400b to appear at various points in the wire feed speed waveform, with certain numeric values being rendered for run in wire feed speed (WFS), start WFS, weld WFS, and crater WFS along with touch activation indicia 400a allowing the user to set values for these wire feeder parameters. In addition, several generally applicable numeric values are displayed with corresponding activation indicia 400a, including preflow time, start time, weld time, crater time, burnback time, and postflow time. As illustrated in FIG. 6B, actuation of the button indicia 460 labeled "VOLTS" causes graphical touch activation indicia 400b to be provided at certain points in the power source output workpoint waveform, together with display of a corresponding set of numeric values for open circuit voltage (OCV), start volts, weld volts, and crater volts. A user may modify values using the indicia 400a and/or may move one or more of the graphical indicia 400b by touching the display 120 at the rendered activation indicia 400, with the corresponding waveform and displayed values being updated. The configuration apparatus 300 will also make corresponding changes to the sequence file 202 in sequence controller 200 (FIG. 5) or download a newly created file 202 thereto. The apparatus 300 thus operates to provide a touch screen-based user interface for designing power source waveforms as well as for configuring sequence controller 200 to globally define system component functionality in a welding operation, wherein the illustrated examples are not exhaustive of the many possible implementations of the various touch screen-based configuration tools of the invention.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A welding system for performing a welding operation, comprising:
   a switching power source having a switching inverter controlled by a pulse width modulated switching signal to provide an electrical welding signal waveform comprising a rapid succession of individual pulses that define the waveform;
   a programmable waveform generation system providing the pulse width modulated switching signal in accordance with a desired waveform file; and
   a waveform design apparatus operatively coupled with the waveform generation system, the waveform design apparatus comprising a touch screen display adapted to display waveform information associated with the desired waveform and a waveform representative of the desired waveform, and at least one touch activation indicia, the waveform design apparatus allowing a user to modify the desired waveform of the waveform generation system by touching the touch activation indicia, wherein the touch screen activation indicia allows the user to change the displayed waveform to modify the desired waveform.

2. A welding system as defined in claim 1, wherein the waveform design apparatus is integrated into the power source.

3. A welding system as defined in claim 1, wherein the waveform design apparatus is integrated into a wire feeder of the welding system.

4. A welding system as defined in claim 1, wherein the touch screen display is adapted to display at least one numeric or Boolean value associated with the desired waveform and wherein the touch activation indicia allows the user to change the value to modify the desired waveform.

5. A welding system as defined in claim 1, wherein the waveform design apparatus is further adapted to obtain actual waveform data from the power source and wherein the touch screen display is adapted to graphically display the actual waveform data.

6. A welding system as defined in claim 1, further comprising a sequence controller providing control signals to the power source and to at least one other welding system component in accordance with a sequence file, wherein the touch screen display is further adapted to display sequence information associated with the sequence file, and wherein the waveform design apparatus allows a user to modify the sequence file of the sequence controller by touching the touch activation indicia.

7. A welding system as defined in claim 1, wherein the waveform design apparatus is integrated into a sequence controller of the welding system.

8. A welding system as defined in claim 1, wherein the power source is a state table based switching power source.

9. A welding system as defined in claim 1, wherein the waveform design apparatus includes means for selectively allowing or preventing access by authorized/unauthorized personnel.

10. A welding system as defined in claim 1, wherein the wave design apparatus is operatively coupled to a network of welders.

11. A welding system for performing a welding operation, comprising:
    a switching power source operable to provide an electrical welding signal according to a switching signal; a programmable waveform generation system providing the switching signal in accordance with a desired waveform;
    a sequence controller providing control signals to the power source and to at least one other welding system component in accordance with a sequence file; and
    a sequencer configuration apparatus operatively coupled with the sequence controller and comprising a touch screen display adapted to display sequence information associated with the sequence file and a sequence waveform associated with the sequence file, and at least one touch activation indicia, the sequencer configuration apparatus allowing a user to modify the sequence file of the sequence controller by touching the touch activation indicia, wherein the touch screen activation indicia allows the user to change the displayed sequence waveform to modify the sequence file.

12. A welding system as defined in claim 11, wherein the sequencer configuration apparatus is integrated into the power source.

13. A welding system as defined in claim 11, wherein the sequencer configuration apparatus is integrated into a wire feeder of the welding system.

14. A welding system as defined in claim 11, wherein the touch screen display is adapted to display at least one numeric or Boolean value associated with the sequence file and wherein the touch activation indicia allows the user to change the value to modify the sequence file.

15. A welding system as defined in claim 11, wherein the sequencer configuration apparatus is integrated into the sequence controller.

16. A welding system as defined in claim 11, wherein the sequencer configuration apparatus includes means for selectively allowing or preventing access by authorized/unauthorized personnel.

17. A welding system as defined in claim 11, wherein the sequencer configuration apparatus is operatively coupled to a network of welders.

18. A touch screen-based welding system configuration tool, comprising a touch screen display integrated into a welding system component, the touch screen display being adapted to display information related to a first one of a programmable switching type welding power source and a welding system sequence controller along and a waveform representative of at least a portion of the information with at least one touch activation indicia, the configuration tool allowing a user to program the first one of the programmable switching type welding power source and the welding system sequence controller by touching the touch activation indicia, wherein the touch screen activation indicia allows the user to change the displayed waveform to program the first one of the programmable switching type welding power source and the welding system sequence controller.

19. A touch screen-based welding system configuration tool as defined in claim 18, wherein the touch screen display is adapted to display at least one numeric or Boolean value associated with the information and wherein the touch activation indicia allows the user to change the value to program the first one of the programmable switching type welding power source and the welding system sequence controller.

20. A method for configuring a welding system, the method comprising:
rendering information related to a first one of a programmable switching type welding power source and a welding system sequence controller along and a waveform representative of at least a portion of the information with at least one touch activation indicia on a touch screen display;
allowing a user to modify the rendered information by touching the touch activation indicia on the touch screen display, wherein the touch screen activation indicia allows the user to change the displayed waveform; and
configuring the first one of the programmable switching type welding power source and the welding system sequence controller according to the modified information.

21. A method as defined in claim 20, wherein rendering the information comprises displaying at least one numeric or Boolean value associated with the information and wherein allowing a user to modify the rendered information comprises allowing the user to change the value by touching the touch activation indicia on the touch screen display.

\* \* \* \* \*